Jan. 24, 1956 C. D. RANDALL 2,731,943
DEVICE FOR USE IN GLAZING DOUGHNUTS
Filed March 18, 1954 2 Sheets-Sheet 2
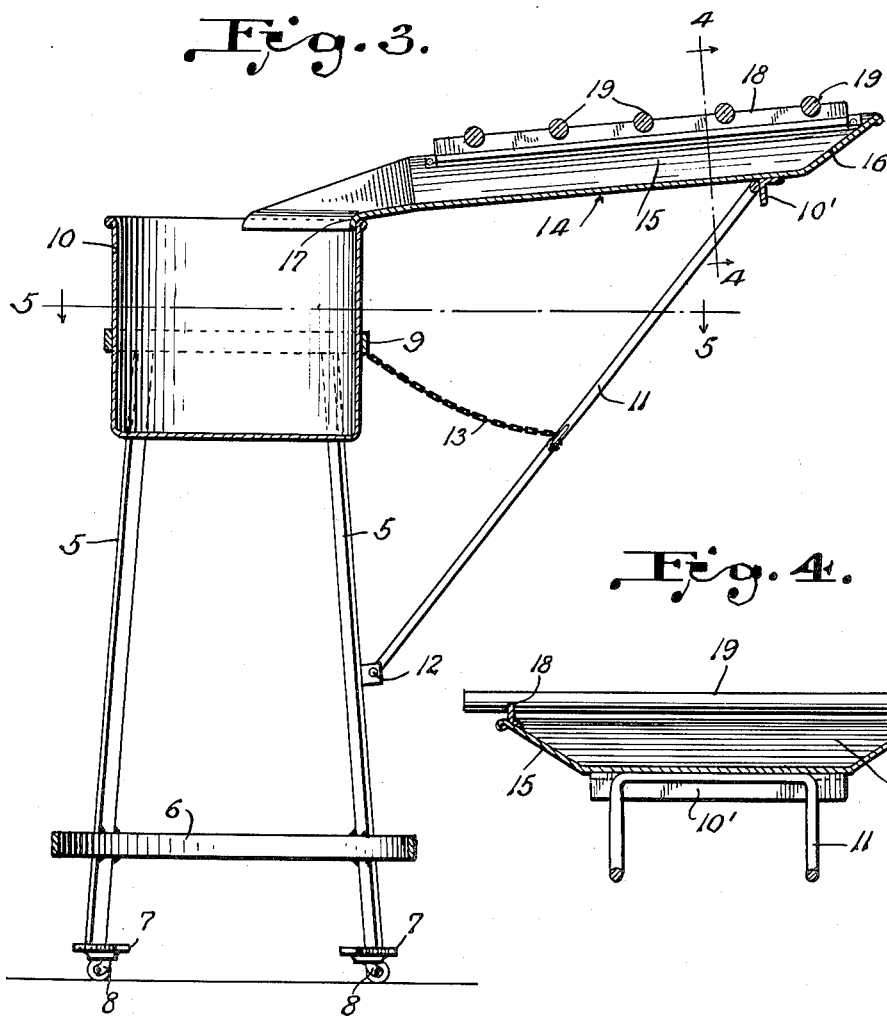
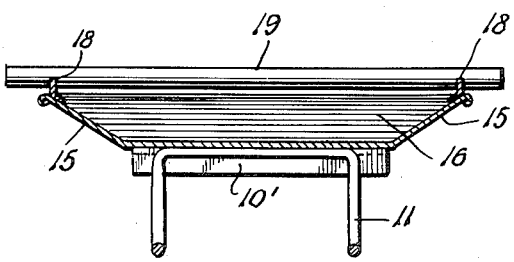
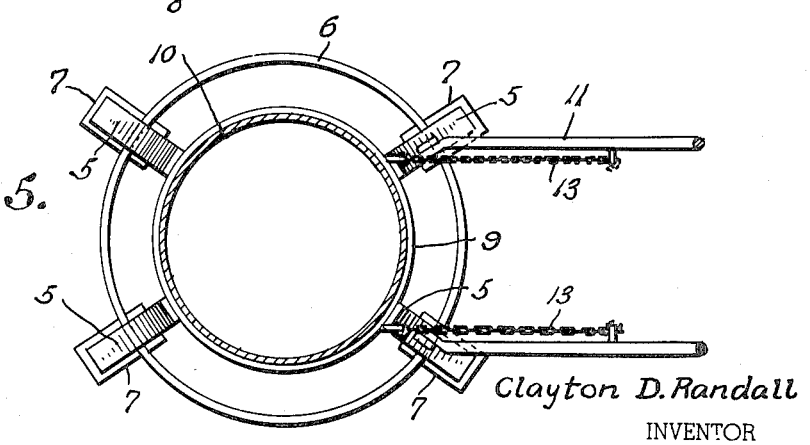
Clayton D. Randall
INVENTOR
BY *Catnow-les.*
ATTORNEYS.

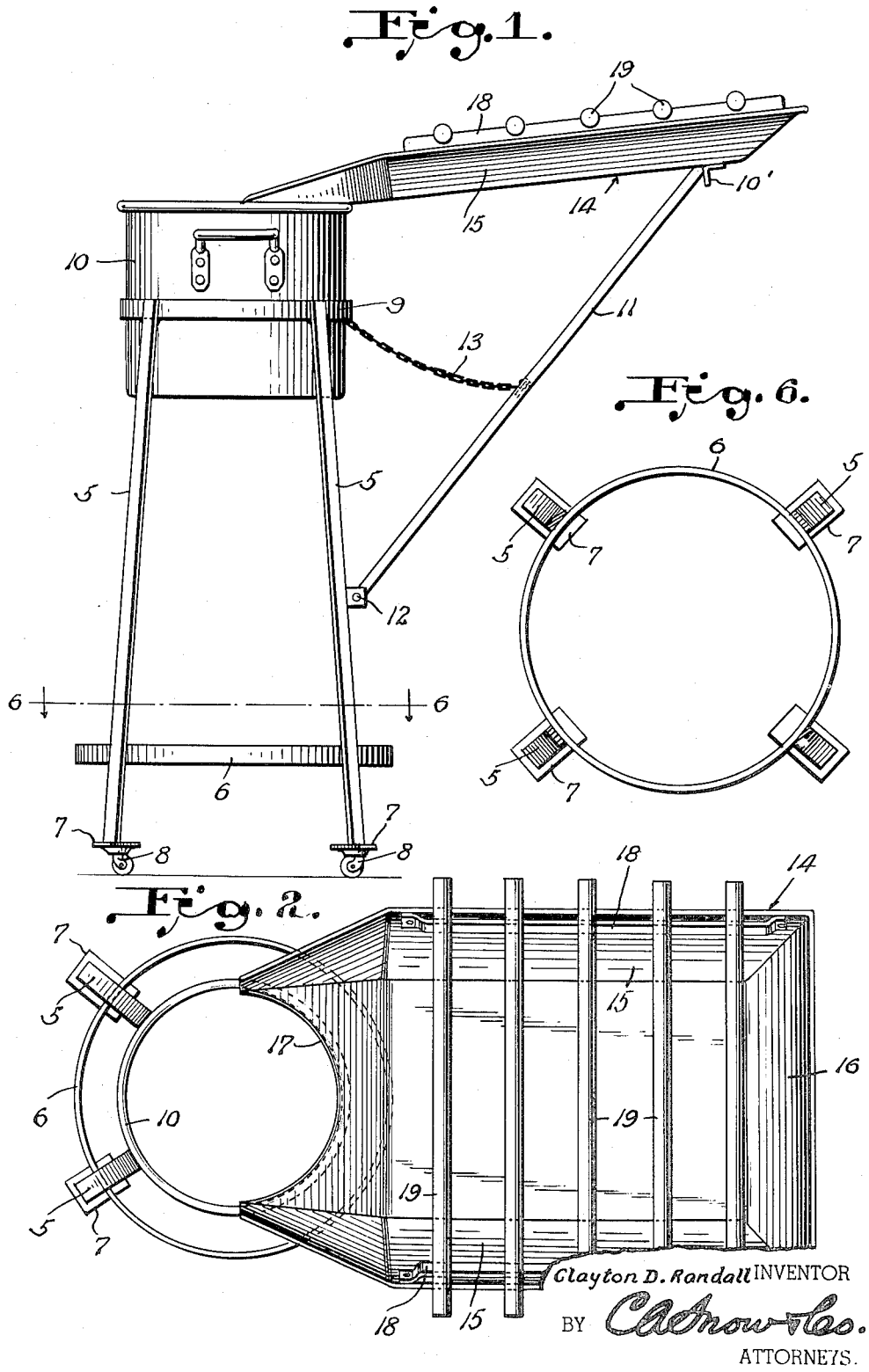

United States Patent Office 2,731,943
Patented Jan. 24, 1956

2,731,943

DEVICE FOR USE IN GLAZING DOUGHNUTS

Clayton D. Randall, Ironwood, Mich.

Application March 18, 1954, Serial No. 417,142

1 Claim. (Cl. 118—31)

This invention relates to a device for use in glazing doughnuts.

An important object of the invention is to provide a device of this character embodying a caster supported stand which is so constructed and arranged that a pot in which the doughnut glazing material is held for ready application to doughnuts supported on racks forming a part of the device, may be readily held therein.

Another object of the invention is the provision of a drain pan with supporting means for supporting the pan in an inclined position so that excessive glazing material applied to doughnuts supported over the pan, may drain into the drain pan and be returned to the pot.

Still another object of the invention is to provide a device of this character including separable component parts which may be readily and easily assembled for use, or dismantled when it is desired to store or transport the device.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Figure 1 is a side elevational view of a device constructed in accordance with the invention.

Fig. 2 is a plan view thereof.

Fig. 3 is a vertical sectional view through the device.

Fig. 4 is a sectional view taken on line 4—4 of Fig. 3.

Fig. 5 is a sectional view taken on line 5—5 of Fig. 3.

Fig. 6 is a sectional view taken on line 6—6 of Fig. 1.

Referring to the drawings in detail, the device comprises a frame made up of a plurality of leg members 5 which are connected at points adjacent to the lower ends thereof by means of the connecting band 6, the lower ends of the leg members being formed with horizontal plates 7 to which the casters 8 are secured.

The upper ends of the leg members 5 are connected by a band or ring member 9, the diameter of the band or ring member 9 being such that a conventional pot 10 for containing glazing material for use in glazing doughnuts, will accurately fit.

The reference character 11 indicates a rectangular supporting member of substantially U-shaped construction, the legs of the supporting member being pivotally connected to certain of the leg members 5, at 12. The length of this supporting member is such that when in its extended position, the upper end thereof will lie in a plane above the upper surface of the pot 10 supported in the frame of the device, engaging cleat 10'.

A chain indicated at 13 is pivotally connected with the upper end of the frame of the device, while the opposite end thereof is connected with the rectangular supporting member 11, as better shown by Fig. 1 of the drawings.

The reference character 14 indicates a drain pan which embodies a length of sheet metal material with inclined side members 15 and an inclined end member 16, the forward end of the drain pan being open and formed with a depending semi-circular flange 17, the curvature of the depending flange being such that it will closely fit within the open upper end of the pot in which it is positioned, in such a way that a close fit is provided against material passing between the open end of the pan and pot.

Secured within the drain pan, and secured to the inclined side members 15 thereof, are bars 18 that extend in parallel spaced relation with each other on opposite sides of the pan, the bars 18 being formed with notches in which the rack bars 19 rest. These bars 19 are of diameters to permit doughnuts to be threaded thereon and held over the pan to receive the glazing material contained in the pot and which is dipped from the pot and spread over the doughnuts.

As the glazing material dries, the surplus glazing material will of course fall into the pan and be directed into the pot for further use.

From the foregoing it will be seen that due to the construction shown and described, I have provided means for conveniently and effectively glazing doughnuts, the glazing material being supported in such a way that it may be readily and easily applied to the doughnuts which have been threaded on the rack bars 19. It is obvious that when the glazing material applied has become thoroughly dried, the racks may be removed and additional doughnuts treated, in such a way that the doughnuts will not become broken or damaged in any way to impair the quality of the doughnuts.

Having thus described my invention, what is claimed is:

In combination, a round pot for holding heated doughnut glazing material, an annular pot supporting band engaging about the pot, supporting legs fixed to and extending downwardly from said band, casters on the lower ends of said legs, a ring-shaped base fixed to said legs adjacent the lower ends thereof, a draining pan formed with a flat bottom and upwardly divergent sides, an upwardly divergent outer end wall, a semi-circular flange at the inner end of said bottom engaging over the rim of the pot, an upwardly extending elongated bar fixed to each side and formed with spaced notches, a plurality of transversely disposed doughnut supporting rods seated in said notches, a cleat fixed to the lower side of said bottom adjacent the outer end thereof, a U-shaped draining pan support having the bight thereof engaging said cleat, a pair of ears fixed to one pair of said legs, means pivotally securing the lower inner ends of said support to said ears, and a pair of chains connected between said band and the parallel sides of said support.

References Cited in the file of this patent

UNITED STATES PATENTS

| | | |
|---|---|---|
| 725,679 | Dore | Apr. 21, 1903 |
| 759,618 | Korbel | May 10, 1904 |
| 1,281,026 | Koerner | Oct. 8, 1918 |
| 1,330,564 | Winkler | Feb. 10, 1920 |
| 1,405,881 | Wallace | Feb. 7, 1922 |
| 1,498,872 | Hammill | June 24, 1924 |
| 2,028,435 | Burns | Jan. 21, 1936 |